UNITED STATES PATENT OFFICE.

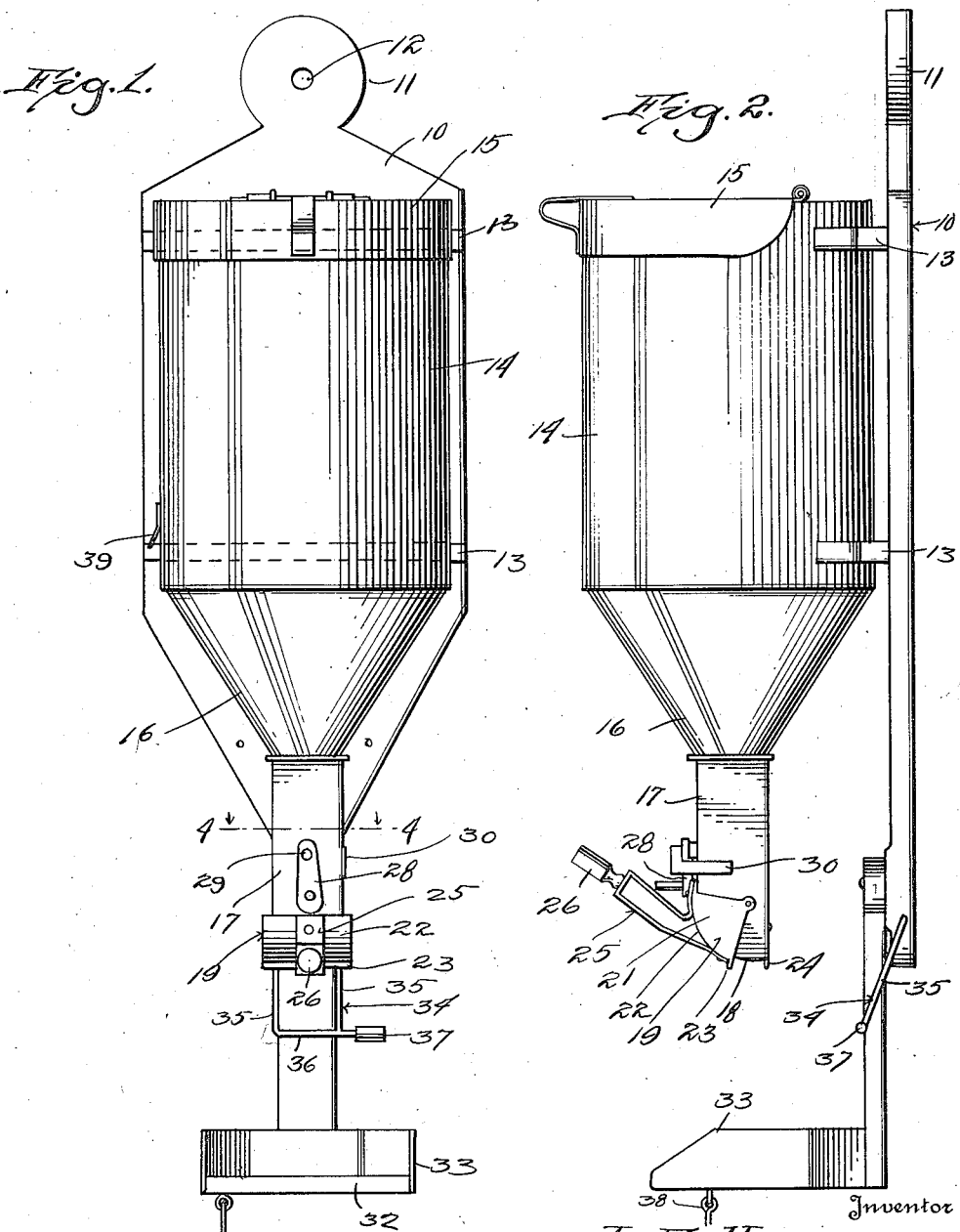

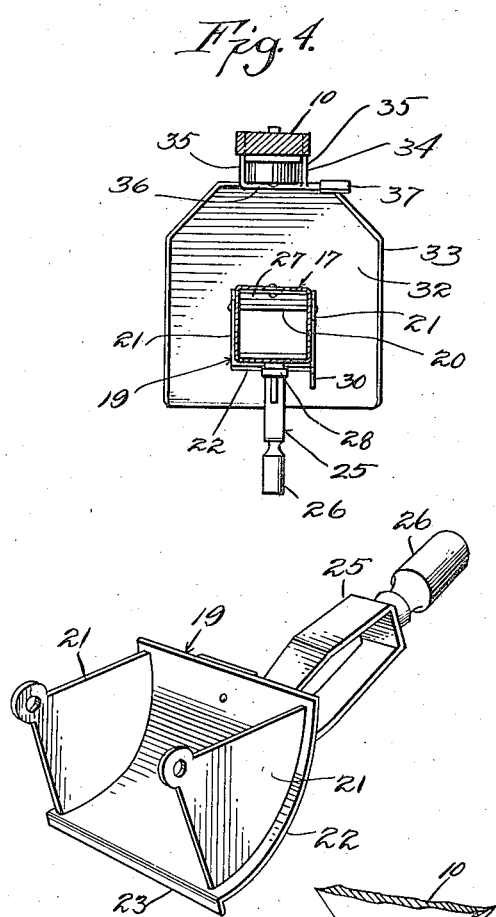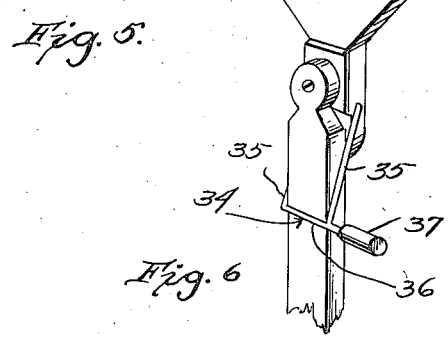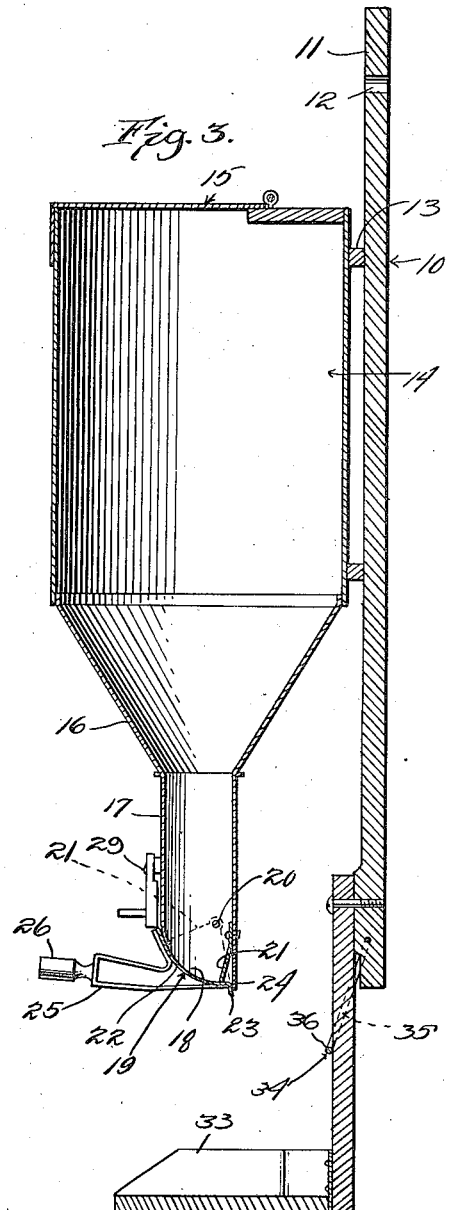

JULIUS E. HORNUNG, OF ANN ARBOR, MICHIGAN.

DISPENSING DEVICE.

1,287,023.   Specification of Letters Patent.   Patented Dec. 10, 1918.

Application filed December 26, 1916. Serial No. 138,856.

*To all whom it may concern:*

Be it known that I, JULIUS E. HORNUNG, a citizen of the United States, residing at Ann Arbor, in the county of Washtenaw, State of Michigan, have invented certain new and useful Improvements in Dispensing Devices; and I do hereby declare the following to be a full, clear, and exact description of the invention, such as will enable others skilled in the art to which it appertains to make and use the same.

This invention is an improvement in dispensing apparatus and has particular reference to a containing and delivering device for coffee and similar materials.

Briefly stated, the invention comprises a hopper container or receptacle attached to a suitable support and having the lower end thereof provided with a closure device of novel construction. Suspended beneath the lower end of the receptacle is a bag supporting platform which may be adjusted and locked both in operative and inoperative positions.

An object of the invention is the provision of a device of this character which is simple in construction, easy to manufacture and effective in carrying out the purpose for which it is designed.

The inventive idea involved is capable of receiving a variety of mechanical expressions one of which for the purpose of illustrating the invention is shown in the accompanying drawings, wherein:—

Figure 1 is a front elevation of the device showing a closure for the receptacle in closing or normal position.

Fig. 2 is a side elevation showing the closure held in open position.

Fig. 3 is a vertical sectional view.

Fig. 4 is a transverse section on the line 4—4 of Fig. 1.

Fig. 5 is a detailed perspective view of the closure device for the lower end of the receptacle.

Fig. 6 is a similar view of the locking device used in connection with the bag supporting platform.

There is shown in the accompanying drawings what is now believed to be the preferred form of the invention which comprises a base 10 having its upper end 11 reduced and provided with an opening 12 whereby the entire device may be attached to the wall or other suitable support. Attached to the base 10 by means of suitable bearing members 13 is a receptacle 14 for containing coffee or like material and having a hinged cover 15 at the top thereof. The receptacle 14 is provided with a hopper bottom 16 which has depending therefrom a chute 17, the lower end of which is curved as indicated at 18. A closure device for the lower end of the chute 17, generally indicated by the numeral 19, is preferably pivoted to the chute by means of a bolt 20 which extends transversely therethrough. This closure device preferably comprises the segmental side plates 21 having openings therein for receiving the bolt 20 and having secured to their arcuate edges a curved closure plate 22 which is provided upon its lower transverse edge with a laterally extending flange 23 which engages the portion 24 of the back of the chute when the closure device is in closing position, said portion 24 forming a stop for said device. This device is normally retained in closing position by gravity and in order to accomplish this result the closure plate 22 is provided with a forwardly extending handle 25 formed of a single strip of metal and having a knob 26 on the outer end thereof. This handle is located beneath the axis of rotation of the closure device and, by reason of its weight, will maintain the closure plate in closing position. When the device is in this position it is desirable to prevent the accidental loss of any of the material in the chute between the back thereof and the flange 23 and for this purpose the deflector plate 27 is secured to the back of the chute interiorly thereof, and has its lower end bent forwardly so that the same is spaced from the lower extremity of said back. The lower end of the plate 27 terminates flush with the lower end of the chute so that it will be seen that when the closure device is in closing position the contents of the chute will be deflected forwardly at the lower end thereof so that any possibility of the material escaping from the chute will be prevented. When it is desired to clean the interior of the receptacle, the closure device is held in open position by means of a latch 28 pivoted at one end at 29 and adapted to frictionally engage the upper front face of the closure plate 22, which friction is sufficient to overcome the weight of the closure device and hold the same open. When the latch 28 is not in use the same is held by a hook 30 carried by the chute.

The lower end of the base 10 is reduced and has pivoted thereto the platform 32 having the sides 33. When desired, this platform is adapted to support a bag thereon so that the same is located beneath the chute and in this manner readily filled and in order to retain the platform in this position a locking device 34 in the form of a wire bail has its free ends pivotally mounted in the sides of the lower end of the base 10 and comprises the parallel arms 35 and the transverse arm 36, one end of the latter carrying a small handle 37. The arms 35 of the bail are sufficiently wide apart to receive therebetween the platform supporting arm and when the bail is swung to locking position said latter arm is prevented from swinging about its pivot, thus steadily maintaining the platform in operative position. When this platform is not in use the bail or locking device may be swung to unlocking position whereupon the platform may be swung about its pivot and a latch 38 carried thereby connected to a lug 39 secured to the side of the receptacle whereby the platform is locked in inoperative position.

What is claimed is:—

In a device of the class described comprising a base, a receptacle carried thereby and having a hopper bottom, a chute depending from said bottom, a closure device for the lower end of said chute including segmental side plates pivoted to said chute, a closure plate carried by the side plates and engaging the rear wall of the chute when in closing position, and a deflector plate secured to the rear wall of the chute in the lower end thereof and having its lower end bent outwardly from said wall to prevent the escape of the contents of the receptacle between said rear wall and the engaging portion of said closure plate.

In testimony whereof, I affix my signature, in the presence of two witnesses.

JULIUS E. HORNUNG.

Witnesses:
 OTTO E. HAAB,
 EMANUEL T. HORNUNG.